(12) United States Patent
Emanuel

(10) Patent No.: US 7,469,710 B1
(45) Date of Patent: Dec. 30, 2008

(54) SUPERSONIC DIFFUSER

(75) Inventor: George Emanuel, Arlington, TX (US)

(73) Assignee: KSY Corporation, Arlington, TX (US)

( * ) Notice: Subject to any disclaimer, the term of this patent is extended or adjusted under 35 U.S.C. 154(b) by 299 days.

(21) Appl. No.: 10/951,109

(22) Filed: Jan. 4, 2005

Related U.S. Application Data

(63) Continuation-in-part of application No. 10/874,040, filed on Jun. 22, 2004, now abandoned.

(51) Int. Cl.
*F16K 49/00* (2006.01)
(52) U.S. Cl. ................ 137/338; 239/500; 239/502; 239/590.5
(58) Field of Classification Search ............ 372/104, 372/89, 58; 239/500, 502, 590.5; 137/338
See application file for complete search history.

(56) References Cited

U.S. PATENT DOCUMENTS

| | | | | |
|---|---|---|---|---|
| 3,401,277 | A | * | 9/1968 | Larson .................. 310/11 |
| 3,617,928 | A | * | 11/1971 | Hausmann .............. 372/104 |
| 3,638,483 | A | * | 2/1972 | Shouman ................ 73/147 |
| 3,654,569 | A | * | 4/1972 | Hausmann .............. 372/104 |
| 3,873,939 | A | * | 3/1975 | Guile et al. ............ 372/104 |
| 3,907,409 | A | * | 9/1975 | Hausmann .............. 372/104 |
| 3,936,771 | A | * | 2/1976 | Kallis .................. 372/104 |
| 3,998,393 | A | | 12/1976 | Petty |
| 4,058,141 | A | | 11/1977 | Hasinger et al. |
| 4,138,777 | A | * | 2/1979 | Kepler et al. ........... 372/104 |
| 4,166,361 | A | | 9/1979 | Earnest et al. |
| 4,207,542 | A | | 6/1980 | Shen |
| 4,235,372 | A | | 11/1980 | Salter |

(Continued)

OTHER PUBLICATIONS

Johannesen, N.H., "Experiments on Two-dimensional Supersonic Flow in Corners and over Concave Surfaces," Phil. Mag., vol. 43, pp. 568-580 (1952).

(Continued)

*Primary Examiner*—Gregory L Huson
*Assistant Examiner*—Cloud K Lee
(74) *Attorney, Agent, or Firm*—Storm LLP; Paul V. Storm; John J. Patti

(57) ABSTRACT

A pressure-recovery device for a supersonic, continuous wave gas laser is capable of recovering the pressure of the supersonic fluid in an efficient manner and in a relatively light and compact assembly. The supersonic diffuser has a substantially rectangular inlet and top and bottom walls that extend from the inlet in the direction of the flow of gas. The top and bottom walls are separated by a height ($l_1$) at the inlet and are connected by two side walls. The side walls are separated by a width (h) at the inlet, wherein the ratio of height to width ranges at the inlet from about 0.001 to about 1. A compression region is formed by the top wall, bottom wall and side walls, wherein said top and bottom walls either are or are not symmetric about a central longitudinal axis of the compression region. The top and bottom walls may each in the shape of a Prandtl-Meyer streamline and the side walls are substantially planar, or the top and bottom walls are each in the shape of a lens analogy streamline and the side walls are substantially planar. A plurality of diffusers may be stacked in series with one another, each of the diffusers being substantially similar in construction.

24 Claims, 4 Drawing Sheets

U.S. PATENT DOCUMENTS

| | | | |
|---|---|---|---|
| 4,247,833 | A | 1/1981 | Morr et al. |
| 4,435,810 | A | 3/1984 | Hasinger et al. |
| 4,457,000 | A | 6/1984 | Rao |
| 4,487,366 | A | 12/1984 | Davis et al. |
| 4,559,628 | A * | 12/1985 | Johnson et al. ............. 372/104 |
| 4,938,112 | A | 7/1990 | Hertzberg et al. |
| 5,467,591 | A * | 11/1995 | Bozzuto et al. ............... 60/772 |
| 5,735,469 | A | 4/1998 | Rodriguez et al. |
| 5,779,196 | A | 7/1998 | Timar |
| 6,003,789 | A | 12/1999 | Base et al. |
| 6,072,820 | A * | 6/2000 | Dickerson ................... 372/104 |
| 6,133,577 | A | 10/2000 | Gutowski et al. |
| 6,194,733 | B1 | 2/2001 | Haas et al. |
| 6,282,894 | B1 | 9/2001 | Smith |
| 6,302,142 | B1 | 10/2001 | Behrens |

OTHER PUBLICATIONS

Lukasiewicz, J., "Diffusers for Supersonic Wind Tunnels," Journal of the Aeronautical Sciences, vol. 20, No. 9, pp. 617-626 (Sep. 1953).
Sears, W.R., "Conflicts Between Theory and Experiment," General Theory of High Speed Aerodynamics, vol. VI (High Speed Aerodynamics and Jet Propulsion), pp. 561-565 (1954).
Roschke, E.J., et al., "Experimental Investigation of Exhaust Diffusers for Rocket Engines," Technical Report No. 32-210, p. 93, NASA, Propulsion Lab., C.I.T. (Mar. 1962).
Svehla, R., "Estimated Viscosities and Thermal Coductivities of Gases at High Temperatures", Technical Report R-132, NASA, p. 98 (1962).
NAVWEPS Report 1488, "Ducts, Nozles and Diffusers," Handbook of Supersonic Aerodynamics, vol. 6, Sec. 17, pp. 269-278, 288-294, Johns Hopkins Univ., MD. (Jan. 1964).
Warren, W.R., Jr., "Reacting flow and pressure recovery processes in HF/DF chemical lasers," Acta Astronautica, vol. 1, pp. 813-834, Pergamon Press (1974).
Durran, D.A., et al., "Pressure Recovery in a Constant-Area Diffuser for Chemical Lasers With Nozzle Base Relief," Report SAMSO-RS-75-147, Aerospace Corp., CA. (Jun. 1975).
Emanuel, G., "Optimum Performance for a Single-Stage Gaseous Ejector," AIAA Journal, vol. 14, No. 9, pp. 1292-1296 (Sep. 1976).
Driscoll, R.J. et al., "Pressure Recovery in Chemical Lasers," AIAA Journal, vol. 15, No. 5, pp. 665-673 (May 1977).
Hanus, G,J. et al., "Leading-Edge Injection for Film Cooling of Turbine Vanes," J. Energy, vol. 1, No. 1, pp. 44-45 (1977).
Vershure, R.W. et al., "Demonstration of a Cooled Laminated Integral Axial Turbine," J. Aircraft, vol. 15, No. 11, p. 735 (Nov. 1978).
Smith, R. et al., "Advanced General Aviation Turbine Engine (Gate) Study," Final Report, NASA CR-159624, Teledyne CAE 1600, pp. 1-2, 21, 23, 26-27, 54, 115 (Jun. 1979).
Durran, D.A. et al., "Stability of a Normal Shock in Radial Reacting Flow With Nonuniformities," Report SD-TR-81-51, Aerospace Corp., CA. (Jun. 1981).
Emanuel, G., "Comparison of One-Dimensional Solutions With Fabri Theory for Ejectors," Acta Mechanica, vol. 44, pp. 187-200 (1982).
Emanuel, G., "Near-field analysis of a compressive supersonic ramp," Phys. Fluids, vol. 25, No. 7, pp. 1127-1133 (Jul. 1982).
Emanuel, G., "Numerical Method and Results for Inviscid Supersonic Flow Over a Compressive Ramp," Computers & Fluids, vol. 11, No. 4, pp. 367-377 (1983).
Emanuel, G., Gasdynamics: Theory and Applications, AIAA Education Series, pp. 101-107, 311-312 (1986).
Smits, A.J. et al., "Experimental study of three shock wave/turbulent boundary layer interactions," J. Fluid Mech., vol. 182, pp. 291-314 (1987).
Shirazi, S.A. et al., "Simple Turbulence Models for Supersonic Flows: Bodies at Incidence and Compression Corners," AIAA Journal, vol. 29, No. 11, pp. 1850-1859 (Nov. 1991).
Lee, J. et al., "Study of Turbulence on Supersonic Compression Surfaces Using Reynolds Stress Model," AIAA Journal, vol. 30, No. 7, pp. 1738-1746 (Jul. 1992).
Moran, M.J. et al., Fundamentals of Engineering Thermodynamics, 2nd Ed., pp. 374-398, John Wiley & Sons, Inc. (1992).
A'rafat, S., "Numerical Analysis of the Viscous Flow in a Supersonic Diffuser," a thesis for graduate a program at Embry-Riddle Aeronautical Univ. of Fla. (unpublished).
McBride, B.J. et al., "Computer Program for Calculation of Complex Chemical Equilibrium Compositions and Applications," NASA Ref. Publ. 1311, pp. 25, 73-74 (1996).
Cengel, Y.A. et al., Thermodynamics, An Engineering Approach, 3rd Ed., pp. 508-523, McGraw-Hill (1998).
Han, et al., Gas Turbine Heat Transfer and Cooling Technology, Chap. 1, pp. 1-25, Taylor & Francis (2000).
Roclawski, H. et al., "Experimental and Computational Investigation of Flow in Gas Turbine Blade Cooling Passages," AIAA Paper 2001-2925, pp. 1-30 (Jun. 2001).
Lohn, P.D. et al., "COIL Laser Diffuser Design," AIAA Paper 2001-3010, pp. 1-9 (Jun. 2001).
Emanuel, G. "Analytical Fluid Dynamics," 2nd Ed., pp. 589-592, CRC Press (2001).
Padture, N.P. et al., "Thermal Barrier Coatings for Gas-Turbine Engine Applications," Science's Compass, vol. 296, pp. 280-284 (Apr. 2002).
Emanuel, G. et al., UTA-MAE Research Report 2002-01 on Steady, Oblique, Detonation Wave, pp. 42-50 (Dec. 2002).
Ligrani, P.M. et al., "Comparison of Heat Transfer Augmentation Techniques," AIAA Journal, vol. 41, No. 3, pp. 337-338 (Mar. 2003).
Emanuel, G. et al., "Lense Analogy for Diffusers and Nozzles," AME Report 98-1, "The School of Aerospace and Mechanical Engineering," Univ. of Oklahoma (Jul. 1998) (unpublished).

* cited by examiner

SUPERSONIC DIFFUSER

CROSS-REFERENCE TO RELATED APPLICATION

This application is a continuation-in-part of application Ser. No. 10/874,040, filed Jun. 22, 2004 now abandoned.

TECHNICAL FIELD

This application relates to diffusers and, more particularly, to a design for an efficient supersonic diffuser.

BACKGROUND

Supersonic diffusers have a variety of applications: wind tunnels, ground testing of high altitude rocket engines, engine inlet for supersonic aircraft, and any supersonic device that operates at a static pressure below ambient. One such device is the continuous wave (cw) supersonic chemical laser. While the present invention focuses on this last application, it may be applicable to other supersonic flows where a diffuser is required.

A supersonic flow, where the pressure is below ambient, occurs in the laser cavity of a cw chemical laser. CW chemical lasers involve a steady, supersonic, low-pressure gaseous flow inside the laser cavity. In fact, all high-performance cw chemical lasers operate supersonically with a laser cavity pressure of a few Torr. For example, a chemical oxygen-iodine laser (COIL) typically operates in the 1 to 10 Torr range, although pressures as high as 20 Torr may be possible. A pressure value above about 4 Torr usually is achieved by adding diluent gas to the singlet oxygen generator (SOG) that drives the COIL device. A diffuser is then used to increase the device's exit pressure. If this exit pressure is still below ambient, the diffuser is followed by a pumping system that typically consists of mechanical pumps or an ejector system. In specialized cases, chemical pumping may be used.

The type of high-performance laser under consideration might be mounted on a motorized vehicle, naval vessel, or on an aircraft. It requires a pressure recovery system to increase the pressure of the high-speed, spent laser effluent from its several Torr value to a pressure level slightly above ambient. At sea level, ambient pressure is about 760 Torr, while ambient pressure for an aircraft at a 40,000 foot altitude would be about 141 Torr. In any case, the size and weight of the pressure recovery system is of crucial importance for the viability of the overall laser system. It is thus important that the pressure recovery system be as compact and lightweight as possible for the intended application.

Diffusers are common devices whose function is to convert as much as possible of the kinetic energy of a fluid, at the inlet of the diffuser, into an increased value for the pressure of the fluid at the device exit. The exit pressure, Pr, is referred to as the recovered pressure. Diffusers come in two categories, depending on whether the inlet flow is subsonic or supersonic. Supersonic diffusers are bulky and generally very inefficient, especially when their inlet Mach number is large.

Diffusers used for chemical lasers generally consist of a converging supersonic section, followed by a throat region, which is then followed by a slowly diverging subsonic diffuser. The throat region and subsonic section can be lengthy. Most of the pressure increase occurs in the throat region, which is a duct containing a system of oblique shock waves. A subsonic diffuser, in order to avoid boundary-layer separation, increases its cross-sectional area gradually. This subsonic section only provides a modest amount of pressure recovery, typically less than 10% of the overall value of a supersonic/subsonic diffuser. For reasons of compactness, the subsonic portion of the diffuser may be attenuated or even bypassed.

An oblique shock system generally starts at the diffuser's inlet and continues into the throat section. Most of the static pressure increase stems from the shock system and not from an isentropic process. By contrast, the stagnation pressure steadily decreases through the shock system. The overall decrease in the stagnation pressure of a diffuser is of crucial importance. At the exit, where the Mach number is small compared to unity, the recovered (static) pressure is essentially the stagnation pressure. A diffuser's efficiency is, therefore, just the ratio of the exit to inlet stagnation pressures. At a supersonic inlet, the stagnation pressure significantly exceeds the static pressure. For steady, isentropic flow, the stagnation pressure is a constant, and the diffuser's second-law efficiency is thus 100%.

The standard pressure recovery system for any supersonic gas flow would be a supersonic/subsonic diffuser as is commonly used with a wind tunnel. Common to such diffusers is a poor efficiency because an oblique shock system is present inside the supersonic section, including the throat section, of the diffuser. The shock system decreases the stagnation pressure of the flow and causes boundary-layer separation.

Use of a conventional supersonic/subsonic diffuser for a chemical laser has a number of major drawbacks, aside from its poor efficiency. They are bulky, heavy, and for a conventional COIL do not provide nearly enough pressure recovery, even for aircraft operation of a COIL at a 40,000 foot altitude. For a conventional COIL system with diluent in the SOG and a diffuser, an ejector system is still required for an aircraft-based system. Compared to a diffuser, an ejector system may be more compact but is heavier, much heavier, as the laser run time increases.

Accordingly, there is a need for a supersonic diffuser able to provide greater pressure recovery than existing diffuser designs while remaining relatively compact and light in weight.

SUMMARY

It is a general object of the present invention to provide a pressure-recovery device for a supersonic, continuous wave gas laser that is capable of recovering the pressure of the supersonic fluid in an efficient manner and in a relatively light and compact assembly. This and other objects of the present invention are achieved by providing a supersonic diffuser having a substantially rectangular inlet. Top and bottom walls extend from the inlet in the direction of the flow of gas. The top and bottom walls are separated by a height ($l_1$) at the inlet and are connected by two side walls. The side walls are separated by a width (h) at the inlet, wherein the ratio of height to width ranges at the inlet from about 0.001 to about 1. A compression region is formed by the top wall, bottom wall and side walls, wherein said top and bottom walls either are or are not symmetric about a central longitudinal axis of the compression region.

According to the preferred embodiment of the present invention, the supersonic flow entering the diffuser is substantially free of intense pressure gradients, such as associated with shock waves.

According to a preferred embodiment of the present invention, at least a portion of the surfaces of the top, bottom and side walls that contact flow of gas are treated to facilitate the maintenance of a turbulent boundary layer.

According to a preferred embodiment of the present invention, the top and bottom walls are each in the shape of a Prandtl-Meyer streamline and the side walls are substantially planar.

According to a preferred embodiment of the present invention, the top and bottom walls are each in the shape of a lens analogy streamline and the side walls are substantially planar.

According to a preferred embodiment of the present invention, the diffuser is substantially isentropic in operation.

According to a preferred embodiment of the present invention, the substantially rectangular inlet is in fluid communication with an optical chamber of a chemical laser to receive the nearly uniform supersonic gas flow.

According to a preferred embodiment of the present invention, the chemical laser is a chemical oxygen-iodine laser (COIL).

According to a preferred embodiment of the present invention, a duct having a rectangular cross section precedes the rectangular inlet, the duct for inducing turbulent boundary layer flow.

According to a preferred embodiment of the present invention, a shock holder is disposed in a duct downstream of the compression region, the shock holder for positioning a weak normal shock in the gas flow.

According to the preferred embodiment of the present invention, a plurality of diffusers are stacked in series with one another, each of the diffusers being substantially similar in construction.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
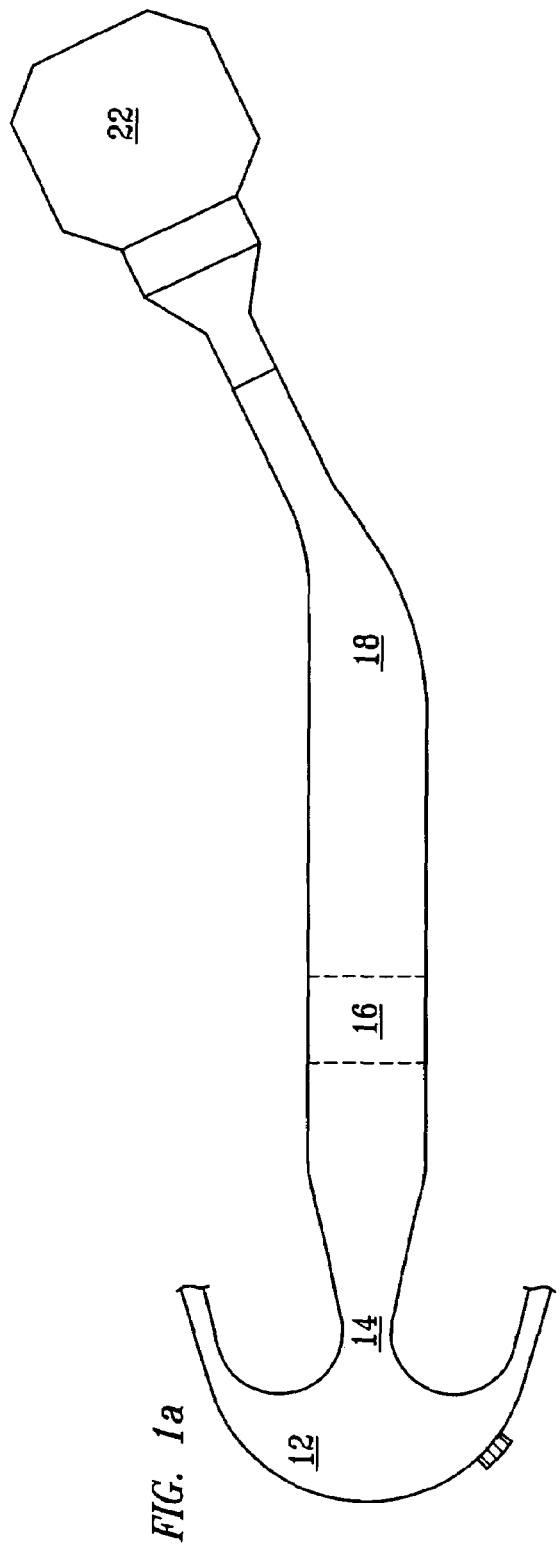
FIG. 1 is schematic diagram of a chemical laser system including a diffuser and a Brayton cycle pump.
Figure 1B:
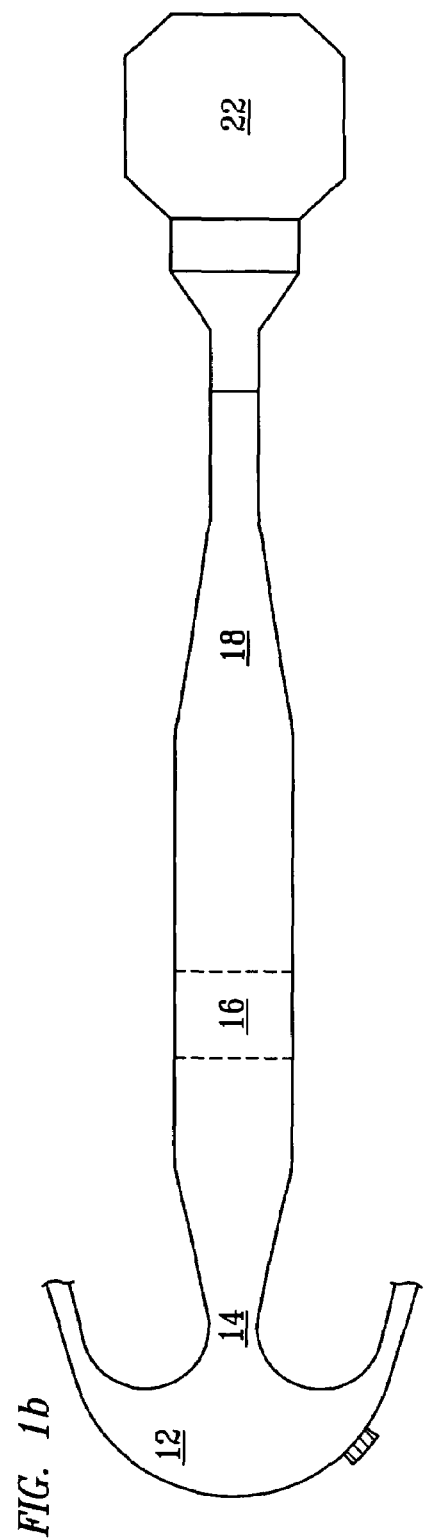

Shown in FIG. 1 is a chemical oxygen iodine laser ("COIL") system. A singlet oxygen generator ("SOG") 12 generates singlet delta oxygen for the laser. The singlet delta oxygen, along with a diluent (collectively "laser gases") is forced from the SOG through the laser nozzle 14. The laser gases flow through an optical or laser cavity 16 at supersonic velocity and at a pressure typically between 1 and 20 Torr. After passing through the optical cavity 16, the laser gases continue, preferably, to a diffuser 18 and a Brayton cycle pump ("BCP") 22. The preferred Brayton Cycle Pump is disclosed in U.S. patent application Ser. No. 10/874,039, filed concurrently herewith and entitled "Laser With Brayton Cycle Pump."

The diffuser 18 and BCP 22 each act to raise the pressure of the effluent stream so that, upon exiting the BCP 22, the static pressure of the effluent will be greater than the ambient pressure and the effluent may be vented. The diffuser 18 is preferably designed according to the lens analogy or the Prandtl-Meyer formulation.

An ejector, reciprocating pump or some equivalent pressure enhancing device may be used in place of the Brayton cycle pump. In some applications, the diffuser alone may increase the pressure above the ambient level, in which case no further pressure enhancement is necessary. The upstream flow entering the diffuser has a velocity $\vec{w}_1$. The laser gas flow is generated by the laser nozzle 14 (FIG. 1). The gas passes through a nearly constant cross-sectional area laser cavity 16 before entering the diffuser. The supersonic diffuser according to the present invention has two embodiments: one designed according to the Prandtl-Meyer (P-M) model and one according to the lens analogy (L-A) model. In both embodiments, the inlet is rectangular in cross-section, and the side walls of the diffuser are planar and parallel. In the P-M embodiment, the upper and lower or top and bottom walls are not symmetric with respect to each other: they are curved in accordance with a Prandtl-Meyer streamline of the flow through the diffuser. In the L-A embodiment, the top and bottom walls are symmetric with respect to one another and a central axis of the diffuser: each wall is curved in accordance with the lens analogy.

The determination of the shapes of the sidewalls of both the P-M embodiment and the L-A embodiment are described below. Both embodiments strive to achieve substantially isentropic operation.

Figure 2:
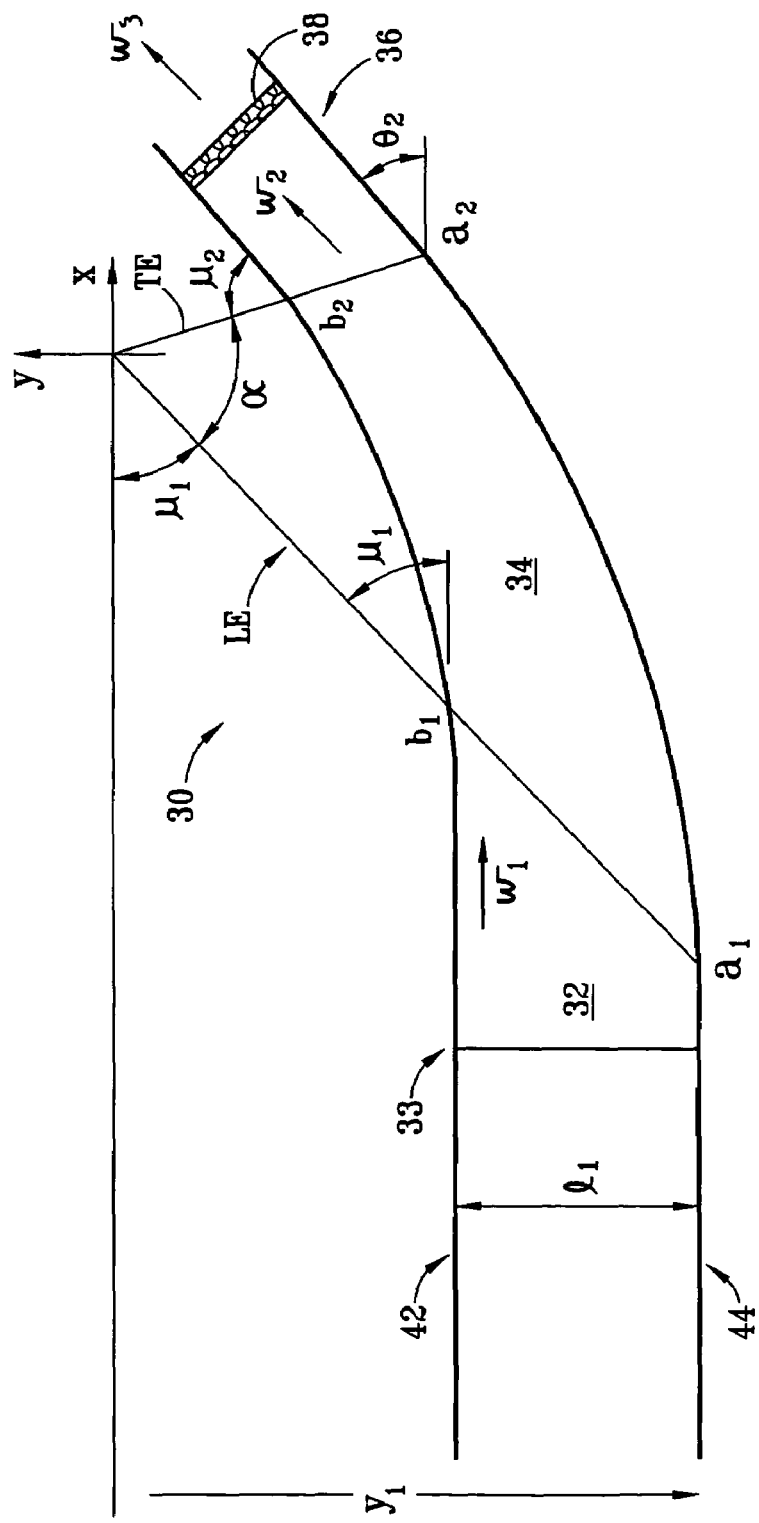
FIG. 2 is a cross section of a Prandtl-Meyer diffuser.

FIG. 2 shows a diffuser 30 using a P-M compression. The diffuser is preferably a rectangular conduit with height l and width h. The width h is constant throughout the length of the diffuser—that is, the side walls are parallel. The height l varies along the length of the diffuser as shown in FIG. 2 and described below. The height at the inlet 33 is designated $l_1$ and is generally in the $10^{-3}$ h to h range.

In order to obtain a nearly isentropic compression, with either a P-M or L-A diffuser, it is imperative that the supersonic flow entering the diffuser be substantially free of any intense pressure gradient, such as associated with shock waves. The preferred "Stable/Unstable Optical Cavity Resonator for Laser," disclosed in U.S. patent application Ser. No. 10/874,064, filed Jun. 22, 2004, is thus warranted. In this disclosure, the supersonic flow inside the laser cavity is confined on all four sides where the confining walls are designed such that shock waves, or other intense pressure gradients, are not generated.

There is preferably a short, roughened wall section 32 near the diffuser inlet 33 just before the beginning of the compression region 34 of the diffuser. The roughened wall section 32 can be used, if needed, to trip the boundary layer and helps to ensure a turbulent boundary layer in the diffuser. This approach dispenses with the need for boundary-layer bleed and/or boundary-layer energization that is sometimes used to shorten the length of supersonic diffusers and improve performance. In addition, the walls of the entire diffuser 30 may be roughened.

In FIG. 2, the compression is shown as a centered P-M compression. It is not essential that the compression be centered; it is, however, convenient. The focal point of the compression is above the upper surface 42 and is the origin for the x,y coordinate system shown in FIG. 2, where the x axis is parallel to $\vec{w}_1$. The focal point could, alternatively, be located below surface 44; in this circumstance, the diffuser would curve downward.

The compression is bounded by its leading edge (LE) and its trailing edge (TE), which are straight characteristics of the same family. Along straight characteristic, all flow properties, such as the pressure and Mach number, are constant. Thus, on the LE, the Mach number and pressure are $M_1$ and $p_1$, while on the TE they are $M_2$ and $p_2$. At start-up, a normal shock wave must pass through the system. For this to occur, the trailing edge Mach number must exceed unity. For this reason, and to avoid unsteady transonic effects in a compressive flow, $M_2$ is preferably limited to a minimum value of about 1.4.

The parameter $\mu$ is the Mach angle and is shown for the LE and the TE. Both walls are P-M streamlines; consequently, the flow between the LE and TE is a simple wave region in which the straight characteristics pass through the origin. The flows upstream and downstream of the LE and TE, respectively, are uniform flows. The downstream flow has an angle $\theta_2$ relative to the upstream flow.

Figure 3:
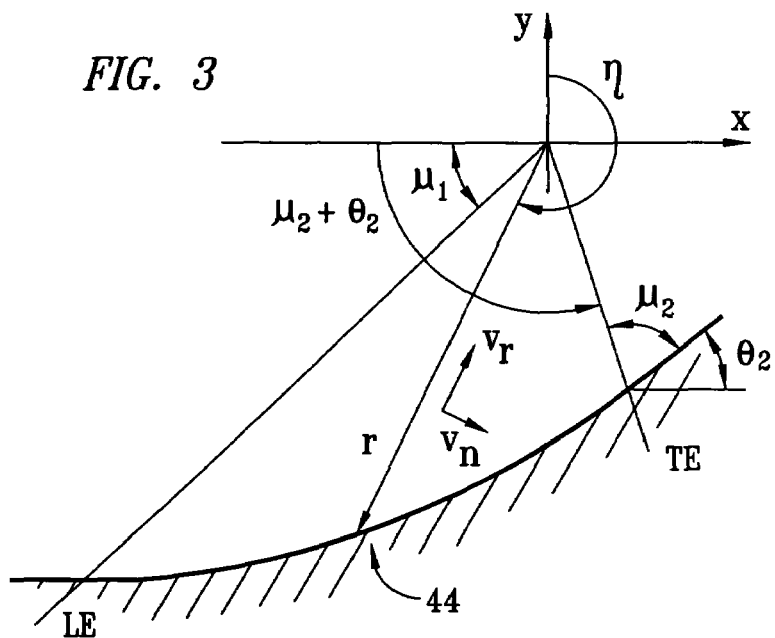
FIG. 3 is a diagram showing the shape of the lower wall of a Prandtl-Meyer diffuser.

FIG. 3 shows the $r,\eta$ coordinates that are used for the wall equations. Note that $\eta$ is measured from the positive y-axis. The angular spread of the compression fan is $\eta_1 - \eta_2$. All lengths, except h, scale with $l_1$. Similarly, pressures can be normalized with $p_1$ and temperatures with the inlet stagnation temperature, $T_o$.

A non-dimensional evaluation requires only $\gamma$, $M_1$, $M_2$, and $y_1/l_1$, where $\gamma$ is the ratio of specific heats, $M_1$ is the Mach number at the LE and $M_2$ is the Mach number at the TE. Dimensional results also require values for $l_1$, h, $p_1$, $T_o$, and R, where $p_1$ is the static pressure at LE, $T_o$ is the inlet stagnation temperature, and R is the universal gas constant.

The viscosity of the gas at the inlet, $\mu_1$, only appears in the Reynolds number. The two Mach numbers are the prescribed values across the compression. The $y_1$ parameter is shown in FIG. 2; it has a negative value that must have an absolute value greater than $l_1$.

The slope ($\mu_1$) of LE, measured from the x-axis, is given by $$\mu_1 = \sin^{-1}\left(\frac{1}{M_1}\right)$$

A diffuser inlet Reynolds number, based on the $l_1$ length, is given by $$Re = \left(\frac{\gamma}{RT_1}\right)^{1/2}\left(\frac{pMl}{\bar{\mu}}\right)_1$$

The $p_o$ parameter is the inlet stagnation pressure, while $p_r$ is an estimate for the recovered pressure. The normal shock recovered pressure is $p_{nr}$, while the $l_2/l_1$ quantity is the area ratio across the compression. The Mach number $M_3$ occurs just downstream of the normal shock; note that $$M_1 > M_2 > 1 > M_3$$

The mass flow rate is $\dot{m}$.

The derivation is outlined for the a and b walls that are streamlines of a centered P-M compression. FIG. 3 shows the $r,\eta$ velocity components, $v_r$ and $v_n$, that satisfy the simple-wave region relation $$\frac{dv_r}{d\eta} = v_n = -a \tag{1}$$

where the speed of sound, a, is given by $$a^2 = \gamma\frac{p}{\rho} = \frac{\gamma-1}{2}q_m^2 - \frac{\gamma-1}{2}(v_r^2 + v_n^2) \tag{2}$$

The maximum speed is $$q_m = \left(\frac{2}{\gamma-1}X_1\right)^{1/2} a_1 \text{ where } X_1 = 1 + \frac{\gamma-1}{2}M_1^2 \tag{3}$$

Combining the above yields $$\frac{dv_r}{d\eta} = -\left(\frac{\gamma-1}{\gamma+1}\right)^{1/2}(q_m^2 - v_r^2)^{1/2} \tag{4}$$

Upon integration, we have $$\frac{v_r}{q_m} = \sin z \tag{5}$$

The z variable is introduced for analytical convenience. It is defined by a linear relation with respect to $\eta$ $$z = \left(\frac{\gamma-1}{\gamma+1}\right)^{1/2}(\eta_1 - \eta) + \sin^{-1}\left(-\frac{\gamma-1}{2}\frac{Z_1}{X_1}\right)^{1/2} \tag{6}$$

but is also related to the Mach number by $$M^2 = 1 + \frac{\gamma+1}{\gamma-1}\tan^2 z \tag{7}$$

The differential equation for the wall shape is $$\frac{1}{r}\frac{dr}{d\eta} = \cot\mu = (M^2 - 1)^{1/2} = -\left(\frac{\gamma+1}{\gamma-1}\right)^{1/2}\tan z \tag{8}$$

Equations (6) and (8) can be integrated, to yield $$r_a = -M_1 y_1 \left(\frac{X}{X_1}\right)^{(\gamma+1)/[2(\gamma-1)]} \tag{9a}$$

$$r_b = -M_1(l_1 + y_1)\left(\frac{X}{X_1}\right)^{(\gamma+1)/[2(\gamma-1)]} \tag{9b}$$

(Note that $y_1$ and $l_1 + y_1$ are negative.)

Wall values are evaluated at an arbitrary sequence of Mach numbers, given by $$M_i = M_1 - \left(\frac{M_1 - M_2}{N}\right)(i-1), \quad i = 1, 2, \ldots, N+1 \quad (10)$$

where i=1 corresponds to points $a_1$ and $b_1$, in FIG. 2, and i=N+1 corresponds to points $a_2$ and $b_2$. The $\eta_i$ values are $$\eta_i = \eta_1 - \left(\frac{\gamma+1}{\gamma-1}\right)^{1/2}\left[z_i + \sin^{-1}\left(\frac{\gamma-1}{2}\frac{Z_1}{X_1}\right)^{1/2}\right] \quad (11)$$

where $$X = 1 + \frac{\gamma-1}{2}M^2 \text{ and } Z = M^2 - 1$$

The two wall shapes are then given by the relations $$x_{ai} = r_{ai}\sin\eta_i, \, y_{ai} = r_{ai}\cos\eta_i \quad (12a)$$

$$x_{bi} = r_{bi}\sin\eta_i, \, y_{bi} = r_{bi}\cos\eta_i \quad (12b)$$

where $r_{ai}$ and $r_{bi}$ are provided by Eqs. (9a) and (9b). The walls have similar shapes, since they are Prandtl-Meyer streamlines. The diagonal distance, L, is the length between points $a_1$ and $b_2$. It is used as a measure of the longitudinal size of the diffuser, and is given by $$L = [(x_{b2} - x_{a1})^2 + (y_{b2} - y_{a1})^2]^{1/2} \quad (13)$$

Note that this estimate does not include a length associated with the short throat section.

Figure 4:
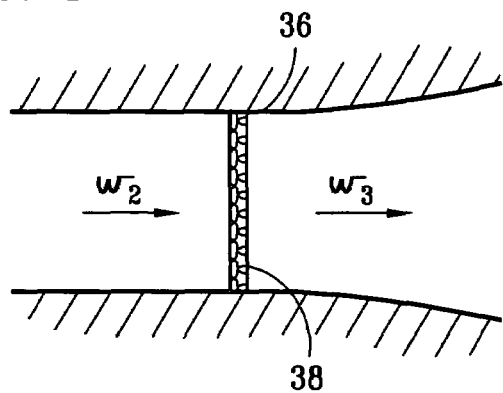
FIG. 4 is a diagram showing the transonic region of a diffuser.

FIG. 4 is a closer view of the transonic region of the preferred embodiment of supersonic diffuser according to the present invention. Downstream of the TE characteristic there is a short duct 36 which is the throat, or transonic, region. The cross-sectional area of the duct 36 should gradually increase with a wall slope of about 0.5° to 1°, relative to the direction of gas flow. This compensates for boundary-layer growth and helps stabilize the shock wave. Inside the duct 36 is a porous fibrous material 38 reminiscent of the filter material used in a heating or air-conditioning circuit, but here more open or porous. The fibrous material 38 provides a small, distributed disturbance that acts as a shock holder for a weak normal shock wave. Alternatively, several screens (not shown) can be used as a shock holder. Downstream of the fibrous material 38 is a high Mach number, subsonic flow. Additional pressure recovery, if needed, can be obtained with a subsonic diffuser (not shown), whose length can be shortened, e.g., using slat or vane inserts.

The diffuser described above is subject to the following constraints for supersonic diffusers. A near vacuum pressure can be used for starting, the boundary layer must be turbulent, and the configuration is designed for a prescribed inlet Mach number. However, in contrast to a conventional supersonic diffuser, the diffuser shown in FIG. 2 is curved.

Figure 5:
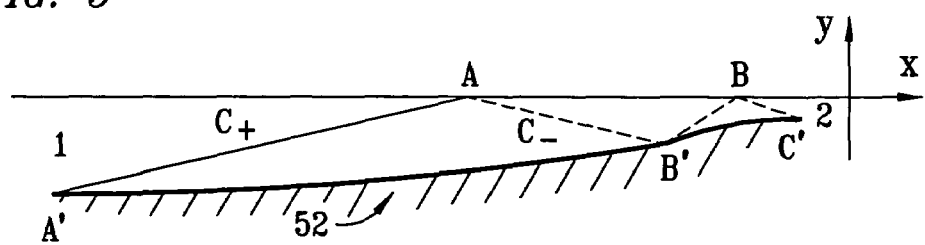
FIG. 5 is a diagram showing the shape of the lower wall of a lens-analogy diffuser.

FIG. 5 shows an alternative design for a supersonic diffuser that is based on the lens analogy (L-A). The lens analogy is based on conceptual similarities between nozzles and diffusers in isentropic gas flow and what several lenses can do with an optical beam.

L-A flow can be complicated by the presence of a limit line. A limit line does not occur in a P-M flow. A limit line was discovered with the hodograph transformation. It is present when the Jacobian of the transformation is zero along a curve that occurs in both the hodograph and physical planes. Because of the Jacobian association, discussion of limit lines has generally been restricted to the two-dimensional hodograph transformation. The fluid acceleration is infinite at a limit line. This interpretation allows the concept to be applied to flows not associated with a hodograph or any other type of transformation. It is the infinite acceleration interpretation that is utilized here.

In the physical plane, an inviscid flow cannot be continued across a limit line, i.e., a streamline that encounters a limit line will reflect off of it by making a 180° turn. Thus, flows with a limit line are analytically multi-valued. Limit lines are only present in sonic or supersonic flows.

A limit line is an analytical phenomenon, somewhat analogous to the crossing of Mach lines of the same family. Neither is physically possible; in both cases a major change in the flow field must occur. Overlapping Mach lines are replaced with a shock wave. Since a limit line only occurs at low supersonic Mach numbers, it can be avoided by terminating the compressive flow, where a limit line can occur, at a slightly higher Mach number, thereby leaving the bulk of the flow field unaltered. In contrast to a P-M diffuser, in a L-A diffuser the $M_2$ value is not arbitrary.

FIG. 5 shows the lower half of a symmetric L-A diffuser where $M_1=4$, $M_2=2$, and the ratio of specific heats, $\gamma$, is 1.4. The $M_2$ value is sufficiently large such that a limit line is not present. FIG. 5 does not show the upstream laser or the downstream throat section. The throat section is similar to the throat section of the diffuser discussed above, and is shown in FIG. 3. The lines A'A and B'B are left-running characteristics, while AB' and BC' are right-running characteristics. These characteristics separate regions of different flow types. Upstream of AA' and downstream of BC' are uniform flow regions with Mach numbers $M_1$ and $M_2$, where $$M_1 > M_2 > 1 > M_3$$

as before.

Regions A'AB'A' and B'BC'B' are simple wave regions. Region AB'BA is a non-simple wave region, but is easily modeled, since it is a line-source flow region whose (suction) origin is the origin of the x,y coordinate system.

As is evident in FIG. 5, the wall 52 has an inflection at point B'. A straight-wall section that points to the origin of the coordinate system can be inserted at point B'. When this is done, the pressure gradient along the wall is discontinuous at the two points where the straight and curved wall sections intersect. This discontinuity does not occur when the curved wall sections meet at the inflection point. Moreover, the diffuser has a minimum length without straight wall segments. Therefore, a L-A diffuser without straight wall sections is preferred.

Much of the earlier discussion relating to FIGS. 2 and 3 also applies here.

The shape of the wall 52 is parametrically given in terms of the Mach number. For the wall between A' and B', $$x = -\frac{l_1}{2}\frac{1}{\phi}\frac{M_1}{M}\left(\frac{X}{X_1}\right)^{(\gamma+1)/[2(\gamma-1)]}[\cos\theta + (\phi-\theta)(Z^{1/2}\cos\theta - \sin\theta)] \quad (14a)$$

-continued $$y = -\frac{l_1}{2}\frac{1}{\phi}\frac{M_1}{M}\left(\frac{X}{X_1}\right)^{(\gamma+1)/[2(\gamma-1)]}[\sin\theta + (\phi-\theta)(Z^{1/2}\sin\theta + \cos\theta)] \quad (14b)$$

where $$M_2 < M_{B'} \leq M \leq M_1 \quad (15a)$$

$$\theta = v_1 - v(M) \quad (15b)$$

$$\phi \equiv \theta_{B'} = \frac{1}{2}(v_1 - v_2) \quad (15c)$$

and $v$ is the Prandtl-Meyer function. $M_{B'}$ is the implicit solution of $$v(M_{B'}) = \frac{1}{2}(v_1 + v_2) \quad (15d)$$

For instance, when $M=M_1$, we obtain $$\theta_1 = 0 \quad (16a)$$

$$\frac{x_1}{l_1} = -\frac{1}{2}\left(Z_1^{1/2} + \frac{1}{\phi}\right) \quad (16b)$$

$$\frac{y_1}{l_1} = -\frac{1}{2} \quad (16c)$$

where the $y_1$ value is the vertical coordinate of point A'.
For the wall between points B' and C', we have $$x = \frac{l_1}{2}\frac{1}{\phi}\frac{M_1}{M}\left(\frac{X}{X_1}\right)^{(\gamma+1)/[2(\gamma-1)]}[-\cos\theta + (\phi-\theta)(\sin\theta + Z^{1/2}\cos\theta)] \quad (17a)$$

$$y = -\frac{l_1}{2}\frac{1}{\phi}\frac{M_1}{M}\left(\frac{X}{X_1}\right)^{(\gamma+1)/[2(\gamma-1)]}[\sin\theta + (\phi-\theta)(\cos\theta - Z^{1/2}\sin\theta)] \quad (17b)$$

where $$1 < M_l < M_2 \leq M \leq M_{B'} \quad (18a)$$

$$\theta = v(M) - v_2 \quad (18b)$$

and $M_l$ is the limit line Mach number, given by $$\frac{8}{\gamma+1}\frac{Z_l^{3/2}}{M_l^4} + v(M_l) = v_1 \quad (18c)$$

For instance, when $M=M_2$, we obtain $$\theta_2 = 0 \quad (19a)$$

$$\frac{x_2}{l_2} = \frac{1}{2}\left(Z_2^{1/2} - \frac{1}{\phi}\right) \quad (19b)$$

$$\frac{y_2}{l_2} = -\frac{1}{2} \quad (19c)$$

where the $y_2$ value is the vertical coordinate of point C'.

Both Eqs. (14) and (17) hold when $M=M_{B'}$, as is evident since $\theta_{B'}$ equals $\phi$. The length of the diffuser is given by $$L = \frac{1}{2}l_1\left[\frac{M_1}{M_2}\left(\frac{X_2}{X_1}\right)^{(\gamma+1)/[2(\gamma-1)]}\left(Z_2^{1/2} - \frac{1}{\phi}\right) + Z_1^{1/2} + \frac{1}{\phi}\right] \quad (20)$$

Three cases are evaluated for each approach, see Table 1. The specific heat ratio is 1.4, and the $M_1$ values span a range expected for COIL.

Table 1. Performance Summary

| Type | $M_1$ | $M_2$ | $\eta_r$ | $\eta_{nr}$ | $L/l_1$ | $\frac{d(p/p_0)}{d(s/l_1)_m}$ |
|------|-------|-------|----------|-------------|---------|-------------------------------|
| P-M  | 2.5   | 1.4   | 0.9582   | 0.4990      | 3.576   | 0.4334                        |
|      | 3.5   | 1.4   | 0.9582   | 0.2129      | 5.228   | 1.116                         |
|      | 4.5   | 1.4   | 0.9582   | 0.0917      | 6.755   | 28.62                         |
| L-A  | 2.5   | 1.3   | 0.9794   | 0.4990      | 2.349   | 6.278                         |
|      | 3.5   | 1.5   | 0.9298   | 0.2129      | 2.790   | 13.94                         |
|      | 4.5   | 1.7   | 0.8557   | 0.0917      | 3.224   | 27.89                         |

The only irreversible process stems from the normal shock whose upstream Mach number is $M_2$. Hence $\eta_{nr}$ has a constant value for a P-M diffuser. For the L-A diffuser, the limit line Mach number values are 1.26, 1.43, or 1.61, respectively, when $M_1$ is 2.5, 3.5, or 4.5. The increasing $M_2$ value causes some fall-off in $\eta_r$. Nevertheless, both approaches provide excellent pressure recovery performance as compared to a conventional diffuser, whose nominal performance is represented by its normal shock recovered pressure efficiency $\eta_{nr}$. When the inlet Mach number is 4.5, the difference in recovered pressure, as provided by $\eta_r$ and $\eta_{nr}$, is about an order-of-magnitude.

Table 1 shows that $L/l_1$ favors the L-A approach. At lower inlet Mach numbers, the P-M approach is favored for its smaller value for the maximum value of the adverse pressure gradient. This changes when $M_1$=4.5. Note that the gradient is rapidly increasing with $M_1$. The rate of increase is less for the L-A diffuser, because $M_2$ is also increasing. Unfortunately, the large gradient value occurs where the Mach number is smallest, and, therefore, where the supersonic boundary layer is most prone to separate.

In both approaches, the wall pressure gradient increases from a near-zero value at the inlet to its maximum value at the outlet. Most of the increase occurs near the downstream end of the compression region. This is evident in FIG. 5, where the relatively short B'C' wall section provides much of the Mach number decrease. It is essential that the maximum value of the wall pressure gradient not cause boundary-layer separation. This value increases rapidly with $M_1$, but $M_1$ is fixed by the upstream laser system. The maximum value of the pressure gradient decreases gradually with an increasing $M_2$ value for the P-M diffuser, and much more rapidly with an L-A diffuser. Recall that increasing $M_2$ decreases the diffuser's efficiency. Alternatively, a non-centered P-M compression can be used.

Figure 6:
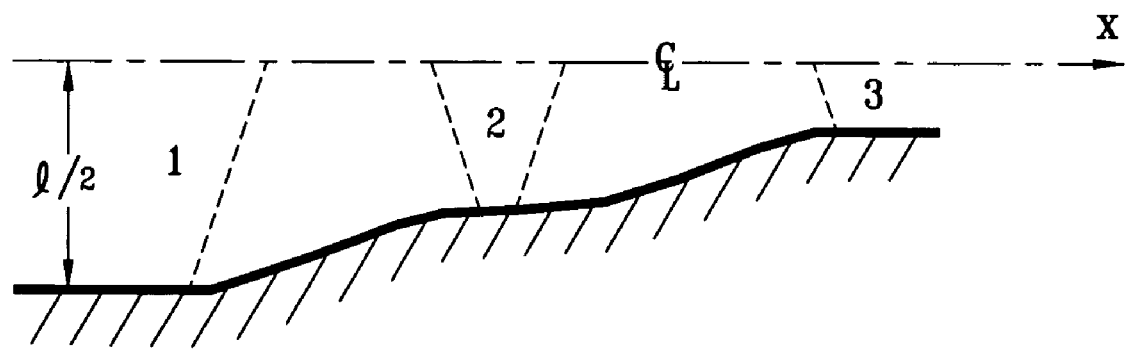
FIG. 6 is a diagram schematically depicting the shape of the lower wall of two lens-analogy diffusers according to the present invention in a stacked (serial) relationship or orientation.

A particularly effective approach for decreasing the maximum value of the pressure gradient is to use "stacking." In this approach, two or more diffusers are in series (outlet of first diffuser coupled to the inlet of the second), as shown schematically in FIG. 6. Region 2 has a Mach number now intermediate between $M_1$ and $M_3$. Of course, the length of a stacked diffuser exceeds that of a single diffuser operating between $M_1$ and $M_3$. The foregoing discussion insures that both approaches can operate without boundary-layer separation.

A new approach is introduced for the supersonic portion and the downstream throat section of a diffuser. Supersonic compression is considered using a Prandtl-Meyer compression (P-M) or the lens analogy (L-A). In each case, the flow is shock free with an isentropic compression; the engineering logic for this expectation is discussed. A short throat section is used, in both cases, that contains a shock holder for a weak normal shock wave. The inviscid wall design of the supersonic sections is provided. A subsonic diffuser may, or may not, be located downstream of the throat section. The two approaches for supersonic compression are analytically evaluated using three criteria: the efficiency of the pressure recovery process, the length of the supersonic portion of the diffuser, and the maximum value of the adverse pressure gradient along the wall of the supersonic section. Avoidance of a limit line and shock free inlet flow can be viewed as additional criteria. Both approaches have comparable efficiencies that significantly exceed current practice; the recovered pressure is close to its isentropic maximum value. A small maximum value for the pressure gradient is important for inhibiting turbulent boundary-layer separation. In turn, this is essential for the physical realization of the approach.

Having thus described the present invention by reference to certain of its preferred embodiments, it is noted that the embodiments disclosed are illustrative rather than limiting in nature and that a wide range of variations, modifications, changes and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A supersonic diffuser adapted to increase the static pressure of a supersonic flow of a gas from a laser having a laser cavity and a longitudinal axis, the diffuser comprising:
    a flow of the gas output from the laser cavity that is substantially free of strong pressure gradients;
    a substantially rectangular inlet that receives the gas;
    a top wall extending from the inlet in the direction of the flow of the gas;
    a bottom wall extending from the inlet in the direction of the flow of the gas, said top wall and said bottom wall separated by a height ($l_1$) at the inlet and connected by two side walls, said side walls separated by a width (h), wherein the ratio of height to width ranges at the inlet from about 0.001 to about 1; and
    a compression region formed by the top wall, bottom wall and side walls, wherein each of the top and bottom walls are in the shape of a streamline that is asymmetric about the longitudinal axis of the diffuser, and wherein the height between the top and bottom walls decreases along at least a portion of the diffuser in the direction of the flow of the gas at a rate so that the gas is substantially free of boundary-layer separation throughout the diffuser.

2. A supersonic diffuser according to claim 1 wherein at least a portion of the surfaces of the top, bottom and side walls that contact flow of gas are treated to facilitate the maintenance of a turbulent boundary layer.

3. A supersonic diffuser according to claim 1 wherein the top and bottom walls are each in the shape of a Prandtl-Meyer streamline and the side walls are substantially planar.

4. A supersonic diffuser according to claim 1, wherein the laser is a chemical oxygen-iodine laser (COIL).

5. A supersonic diffuser according to claim 1, further comprising:
    a duct having a rectangular cross section preceding the rectangular inlet and inducing turbulent boundary layer flow.

6. A supersonic diffuser according to claim 1, further comprising:
    a shock holder in a duct downstream of the compression region, the shock holder for positioning a weak normal shock in the gas flow.

7. A supersonic diffuser adapted to increase the static pressure of a supersonic flow of a gas from a laser having a laser cavity and a longitudinal axis, the diffuser comprising:
    a flow of the gas output from the laser cavity that is substantially free of strong pressure gradients;
    a substantially rectangular inlet that receives the gas;
    a top wall extending from the inlet in the direction of the flow of the gas;
    a bottom wall extending from the inlet in the direction of the flow of the gas, said top wall and said bottom wall separated by a height ($l_1$) at the inlet and connected by two side walls, said side walls separated by a width (h), wherein the ratio of height to width ranges at the inlet from about 0.001 to about 1; and
    a compression region formed by the top wall, bottom wall and side walls, wherein each of the top and bottom walls are in the shape of a streamline that is symmetric about the longitudinal axis of the diffuser, and wherein the height between the top and bottom walls decreases along at least a portion of the diffuser in the direction of the flow of the gas at a rate so that the gas is substantially free of boundary-layer separation throughout the diffuser.

8. A supersonic diffuser according to claim 7, wherein at least a portion of the surfaces of the top, bottom and side walls that contact the gas stream are treated to facilitate the maintenance of a turbulent boundary layer.

9. A supersonic diffuser according to claim 7, wherein the top and bottom walls are each in the shape of a lens analogy streamline and the side walls are substantially planar.

10. A supersonic diffuser according to claim 7, wherein the laser is a chemical oxygen iodine laser (COIL).

11. A supersonic diffuser according to claim 7, further comprising:
    a duct having a rectangular cross section preceding the rectangular inlet and inducing turbulent boundary layer flow.

12. A supersonic diffuser according to claim 7, further comprising:
    a shock holder in a duct downstream of the compression region, the shock holder for positioning a weak normal shock in the gas flow.

13. A supersonic diffuser adapted to increase the static pressure of a supersonic flow of a gas from a laser having a laser cavity, the diffuser comprising:
    a first diffuser having an inlet for receiving the gas from the laser cavity and an outlet;

a second diffuser having an inlet in fluid communication with the outlet of the first diffuser, each of the first and second diffusers having:
- a longitudinal axis;
- a flow of the gas that is substantially free of strong pressure gradients;
- a substantially rectangular inlet;
- a top wall extending from the inlet in the direction of the flow of gas;
- a bottom wall extending from the inlet in the direction of the flow of gas, said top wall and said bottom wall separated by a height ($l_1$) at the inlet and connected by two side walls, said side walls separated by a width (h), wherein the ratio of height to width ranges at the inlet from about 0.001 to about 1; and
- a compression region formed by the top wall, bottom wall and side walls, wherein each of the top and bottom walls are in the shape of a streamline that is asymmetric about the longitudinal axis of the diffuser, and wherein the height between the top and bottom walls decreases along at least a portion of the diffuser in the direction of the flow of the gas at a rate so that the gas is substantially free of boundary-layer separation throughout the diffuser.

14. The supersonic diffuser according to claim 13 wherein at least a portion of the surfaces of the top, bottom and side walls that contact flow of gas are treated to facilitate the maintenance of a turbulent boundary layer.

15. A supersonic diffuser according to claim 13 wherein the top and bottom walls are each in the shape of a Prandtl-Meyer streamline and the side walls are substantially planar.

16. A supersonic diffuser according to claim 13, wherein the laser is a chemical oxygen-iodine laser (COIL).

17. A supersonic diffuser according to claim 13, further comprising:
- a duct having a rectangular cross section preceding the rectangular inlet and inducing turbulent boundary layer flow.

18. A supersonic diffuser according to claim 13, further comprising:
- a shock holder in a duct downstream of the compression region, the shock holder for positioning a weak normal shock in the gas flow.

19. A supersonic diffuser adapted to increase the static pressure of a supersonic flow of a gas from a laser having a laser cavity, the diffuser comprising:
- a first diffuser having an inlet for receiving the gas from the laser cavity and an outlet;
- a second diffuser having an inlet in fluid communication with the outlet of the first diffuser, each of the first and second diffusers having:
  - a longitudinal axis;
  - a flow of the gas that is substantially free of strong pressure gradients and that is substantially free of boundary layer separation throughout the diffuser;
  - a substantially rectangular inlet;
  - a top wall extending from the inlet in the direction of the flow of gas;
  - a bottom wall extending from the inlet in the direction of the flow of gas, said top wall and said bottom wall separated by a height ($l_1$) at the inlet and connected by two side walls, said side walls separated by a width (h), wherein the ratio of height to width ranges at the inlet from about 0.001 to about 1; and
  - a compression region formed by the top wall, bottom wall and side walls, wherein each of the top and bottom walls are in the shape of a streamline that is symmetric about the longitudinal axis of the diffuser, and wherein the height between the top and bottom walls decreases along at least a portion of the diffuser in the direction of the flow of the gas at a rate so that the gas is substantially free of boundary-layer separation throughout the diffuser.

20. A supersonic diffuser according to claim 19, wherein at least a portion of the surfaces of the top, bottom and side walls that contact the gas stream are treated to facilitate the maintenance of a turbulent boundary layer.

21. A supersonic diffuser according to claim 19, wherein the top and bottom walls are each in the shape of a lens analogy streamline and the side walls are substantially planar.

22. A supersonic diffuser according to claim 19, wherein the laser is a chemical oxygen iodine laser (COIL).

23. A supersonic diffuser according to claim 19, further comprising:
- a duct having a rectangular cross section preceding the rectangular inlet and inducing turbulent boundary layer flow.

24. A supersonic diffuser according to claim 19, further comprising:
- a shock holder in a duct downstream of the compression region, the shock holder for positioning a weak normal shock in the gas flow.

* * * * *